United States Patent
Sugita

(10) Patent No.: US 11,188,373 B2
(45) Date of Patent: Nov. 30, 2021

(54) EXECUTING INTERRUPT PROCESSING OF VIRTUAL MACHINES USING PROCESSOR'S ARITHMETIC UNIT

(71) Applicant: RENESAS ELECTRONICS CORPORATION, Tokyo (JP)

(72) Inventor: Yasuhiro Sugita, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 288 days.

(21) Appl. No.: 16/404,162

(22) Filed: May 6, 2019

(65) Prior Publication Data
US 2019/0354393 A1 Nov. 21, 2019

(30) Foreign Application Priority Data

May 18, 2018 (JP) .............................. JP2018-096329

(51) Int. Cl.
| | | |
|---|---|---|
| *G06F 9/455* | (2018.01) | |
| *G06F 7/48* | (2006.01) | |
| *G06F 9/48* | (2006.01) | |
| *G06F 9/30* | (2018.01) | |

(52) U.S. Cl.
CPC ............ *G06F 9/45558* (2013.01); *G06F 7/48* (2013.01); *G06F 9/3001* (2013.01); *G06F 9/4812* (2013.01)

(58) Field of Classification Search
CPC .. G06F 9/45558; G06F 9/3001; G06F 9/4812; G06F 13/24
See application file for complete search history.

(56) References Cited

U.S. PATENT DOCUMENTS

| | | | |
|---|---|---|---|
| 5,506,975 A | 4/1996 | Onodera | |
| 9,329,880 B2 | 5/2016 | Tsirkin et al. | |
| 2010/0115512 A1* | 5/2010 | Sakai | ................. G06F 9/45533 718/1 |
| 2010/0299470 A1 | 11/2010 | Uno | |

(Continued)

FOREIGN PATENT DOCUMENTS

| | | |
|---|---|---|
| JP | 06-250850 A | 9/1994 |
| JP | 4065131 B2 | 3/2008 |

(Continued)

OTHER PUBLICATIONS

"What is Arithmetic Logic Unit (ALU)—Definition from Techopedia," The Wayback Machine, dated Oct. 19, 2012 (accessed on Jul. 16, 2021) (Year: 2012).*

(Continued)

*Primary Examiner* — Benjamin C Wu
(74) *Attorney, Agent, or Firm* — McDermott Will & Emery LLP

(57) ABSTRACT

A data processing device that can monitor properly the state of the interrupt processing of a virtual machine is provided. The data processing device according to an aspect of the present disclosure includes an arithmetic unit that executes multiple virtual machines, respectively, and an interrupt controller that instructs execution of the interrupt processing to the arithmetic unit with the virtual machine information to specify at least one of the multiple virtual machines. The interrupt controller includes a counter to count the number of interrupts for each virtual machine based on the virtual machine information.

14 Claims, 15 Drawing Sheets

(56) References Cited

U.S. PATENT DOCUMENTS

| | | | |
|---|---|---|---|
| 2013/0159580 A1 | 6/2013 | Dong et al. | |
| 2014/0229938 A1* | 8/2014 | Tsirkin | G06F 13/32 718/1 |
| 2016/0004554 A1* | 1/2016 | Minezaki | G06F 11/2041 718/1 |
| 2016/0034332 A1* | 2/2016 | Sato | G06F 11/0724 714/49 |

FOREIGN PATENT DOCUMENTS

| | | |
|---|---|---|
| JP | 2010-271993 A | 12/2010 |
| WO | 2011/161893 A1 | 12/2011 |

OTHER PUBLICATIONS

Extended European Search Report issued in corresponding European Patent Application No. 19175063.7-1221, dated Oct. 2019.
Japanese Notice of Reasons for Refusal issued in corresponding Japanese Patent Application No. 2018-096329, dated Aug. 3, 2021, with English translation.

* cited by examiner

FIG. 3

CCFG

| COUNT SETUP | MEANING |
|---|---|
| VMM | 1: COUNT EVENT OF VMM<br>0: DON'T COUNT EVENT OF VMM |
| VM0 | 1: COUNT EVENT OF VM0<br>0: DON'T COUNT EVENT OF VM0 |
| VM1 | 1: COUNT EVENT OF VM1<br>0: DON'T COUNT EVENT OF VM1 |
| VM2 | 1: COUNT EVENT OF VM2<br>0: DON'T COUNT EVENT OF VM2 |
| VM3 | 1: COUNT EVENT OF VM3<br>0: DON'T COUNT EVENT OF VM3 |

FIG. 4

| VIRTUAL MACHINE CLASSIFICATION | VMD | VMID |
|---|---|---|
| VMM | 0 | × |
| VM0 | 1 | 0 |
| VM1 | 1 | 1 |
| VM2 | 1 | 2 |
| VM3 | 1 | 3 |

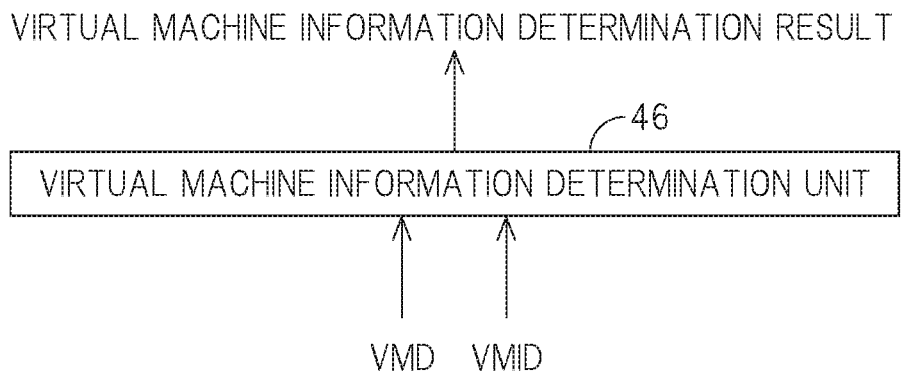
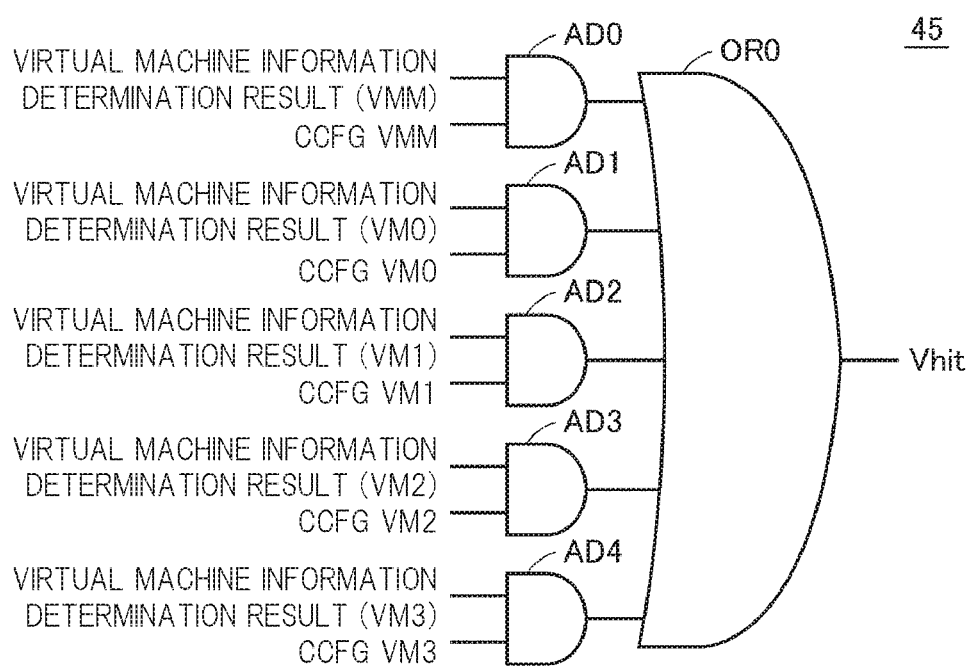

FIG. 8A

| | | | 65 |
|---|---|---|---|
| CH10 | VMD=1 | VMID=0 | |
| CH11 | VMD=1 | VMID=0 | |
| CH20 | VMD=1 | VMID=1 | |
| CH21 | VMD=1 | VMID=1 | |

| CCH0 | CNT |
|---|---|
| CCH1 | CNT |
| CCH2 | CNT |
| CCH3 | CNT |

35

| |
|---|
| CCFG ONLY VM0 IS SET 1 CND CHE=0 |
| CCFG ONLY VM0 IS SET 1 CND CHE=1 CHNUM 10 |
| CCFG ONLY VM1 IS SET 1 CND CHE=0 |
| CCFG ONLY VM1 IS SET 1 CND CHE=1 CHNUM 20 |

FIG. 8C

| INTERRUPT CH | COUNT (YES OR NO) | | | |
|---|---|---|---|---|
| | COUNTER CHANNEL CCH0 | COUNTER CHANNEL CCH1 | COUNTER CHANNEL CCH2 | COUNTER CHANNEL CCH3 |
| CH10 | YES | YES | NO | NO |
| CH11 | YES | NO | NO | NO |
| CH20 | NO | NO | YES | YES |
| CH21 | NO | NO | YES | NO |

DETERMINATION OF ACCESS MACHINE INFORMATION

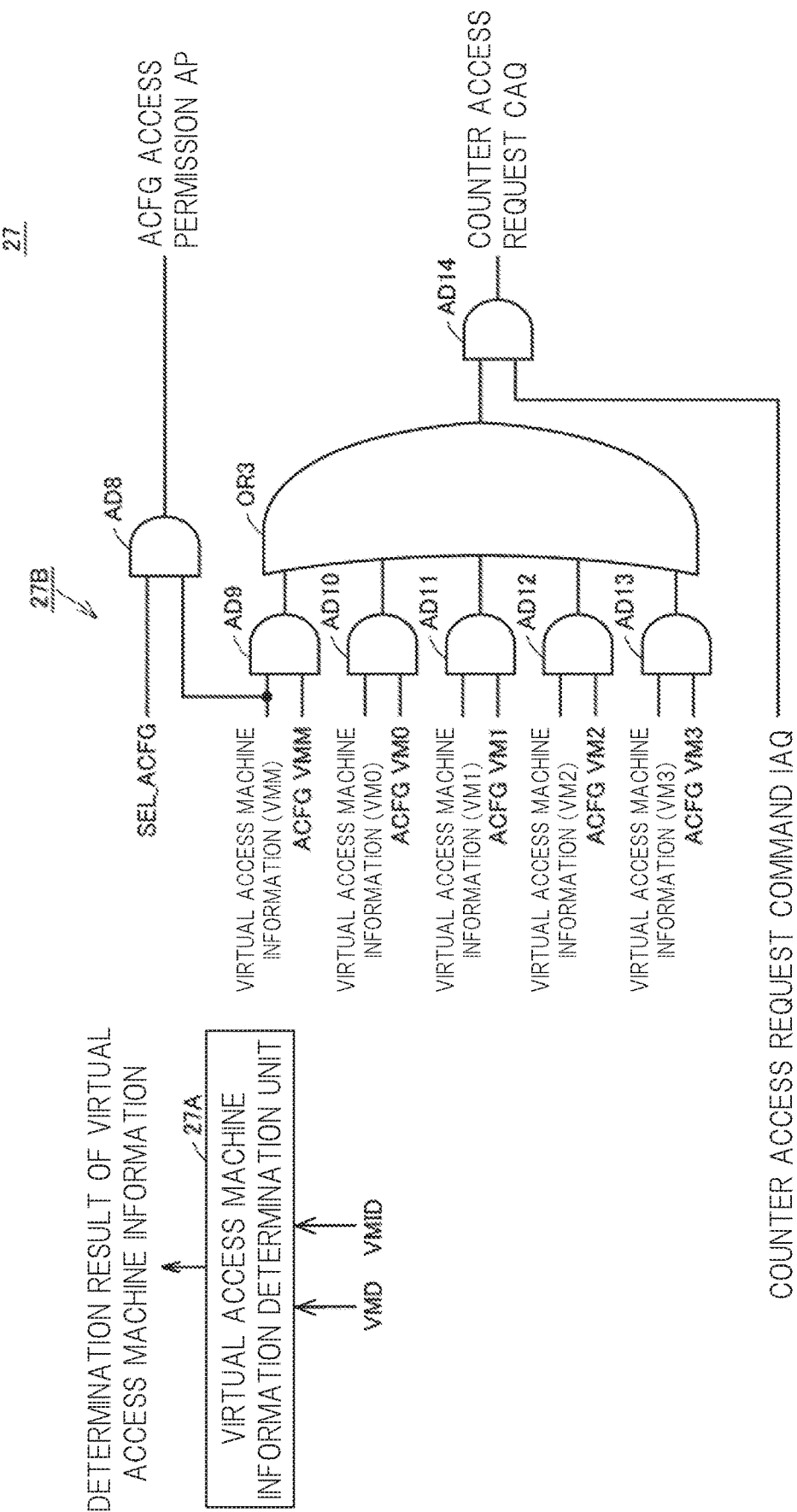

FIG. 13A

| CCH0 | ACFG ONLY VM0 IS SET 1 |
|---|---|
| CCH1 | ACFG ONLY VMM AND VM1 ARE SET 1 |

FIG. 13B

| ACCESS REQUEST FROM CPU ||| ACCESS PERMITTED/ NOT PERMITTED |
|---|---|---|---|
| MACHINE | ACCESS DESTINATION CCH | ACCESS DESTINATION RESOURCES | |
| VMM | 0 | EXCEPT ACFG | NOT PERMITTED |
| | | ACFG | PERMITTED |
| | 1 | EXCEPT ACFG | PERMITTED |
| | | ACFG | PERMITTED |
| VM0 | 0 | EXCEPT ACFG | PERMITTED |
| | | ACFG | NOT PERMITTED |
| | 1 | EXCEPT ACFG | NOT PERMITTED |
| | | ACFG | NOT PERMITTED |
| VM1 | 0 | EXCEPT ACFG | NOT PERMITTED |
| | | ACFG | NOT PERMITTED |
| | 1 | EXCEPT ACFG | PERMITTED |
| | | ACFG | NOT PERMITTED |

FIG. 16A

| | | | |65#|
|---|---|---|---|
| CH0 | VMD=0 | VMID=0 | CID=0 |
| CH10 | VMD=1 | VMID=0 | CID=0 |
| CH11 | VMD=1 | VMID=0 | CID=1 |
| CH20 | VMD=1 | VMID=0 | CID=2 |
| CH21 | VMD=1 | VMID=0 | CID=2 |

FIG. 16B

| | | |35#|
|---|---|---|
| CCH0 | CCFG ONLY VM0 IS SET 1 | CND# CIE=0 |
| CCH1 | CCFG ONLY VM0 IS SET 1 | CND# CIE=1  IDNUM 1 |
| CCH2 | CCFG ONLY VM0 IS SET 1 | CND# CIE=1  IDNUM 2 |

FIG. 16C

| INTERRUPT CH | COUNT (YES OR NO) | | |
|---|---|---|---|
| | COUNTER CHANNEL CCH0 | COUNTER CHANNEL CCH1 | COUNTER CHANNEL CCH2 |
| CH0 | NO | NO | NO |
| CH10 | YES | NO | NO |
| CH11 | YES | YES | NO |
| CH20 | YES | NO | YES |
| CH21 | YES | NO | YES |

EXECUTING INTERRUPT PROCESSING OF VIRTUAL MACHINES USING PROCESSOR'S ARITHMETIC UNIT

CROSS-REFERENCE TO RELATED APPLICATIONS

The disclosure of Japanese Patent Application No. 2018-096329 filed on May 18, 2018 including the specification, drawings and abstract is incorporated herein by reference in its entirety.

BACKGROUND

The present disclosure relates to a data processing device that can execute multiple virtual machines.

Hitherto, systems have been proposed to detect abnormalities by monitoring interrupt processing to a CPU (Central Processing Unit).

For example, Japanese Patent No. 4065131 discloses a system in which the time between events of interrupt processing is measured to detect abnormalities of a CPU based on the measured time.

On the other hand, there is virtualization technology that makes a single physical resource (hardware resource) look like multiple resources. By employing this virtualization technology, it is possible to operate multiple virtual machines (VM) on one CPU, for example, and accordingly, it is possible to operate a different operating system (OS) on each of the virtual machines.

Each virtual machine (VM) is required to satisfy the independent functional safety. That is, it is necessary to guarantee that those functions are free from mutual interference (Freedom From Interference (FFI)).

In order to guarantee this point, it is necessary to employ the scheme that enables monitoring the state of the interrupt processing of a virtual machine.

(Patent Literature 1) Japanese Patent No. 4065131

SUMMARY

The present disclosure is made in order to solve the above-described issue, by providing a data processing device that can monitor the state of the interrupt processing of a virtual machine properly.

The other issues and new features of the present invention will become clear from the description of the present specification and the accompanying drawings.

A data processing device according to one implementation example of the present disclosure includes an arithmetic unit that executes each of multiple virtual machines; and an interrupt controller that instructs the arithmetic unit to execute interrupt processing with virtual machine information for specifying at least one of the virtual machines. The interrupt controller includes a counter that counts the number of interrupts for each virtual machine based on the virtual machine information.

According to the one implementation example, the data processing device according to the present disclosure can monitor the state of the interrupt processing of a virtual machine properly.

BRIEF DESCRIPTION OF THE DRAWINGS

FIG. 3 is a drawing illustrating count target setting information CCFG according to Embodiment 1;

FIG. 4 is a drawing illustrating virtual machine information according to Embodiment 1;

FIGS. 5A and 5B are drawings illustrating the configuration of a VM coincidence determination unit 45 according to Embodiment 1;

FIGS. 8A, 8B, and 8C are drawings illustrating a concrete example of count processing according to Embodiment 1;

FIGS. 12A and 12B are drawings illustrating the configuration of a counter access request generating unit 27 according to Embodiment 1;

FIGS. 13A and 13B are drawings illustrating a concrete example of access processing according to Embodiment 1;

FIGS. 16A, 16B, and 16C are drawings illustrating a concrete example of count processing according to Embodiment 2.

DETAILED DESCRIPTION

Figure 1:
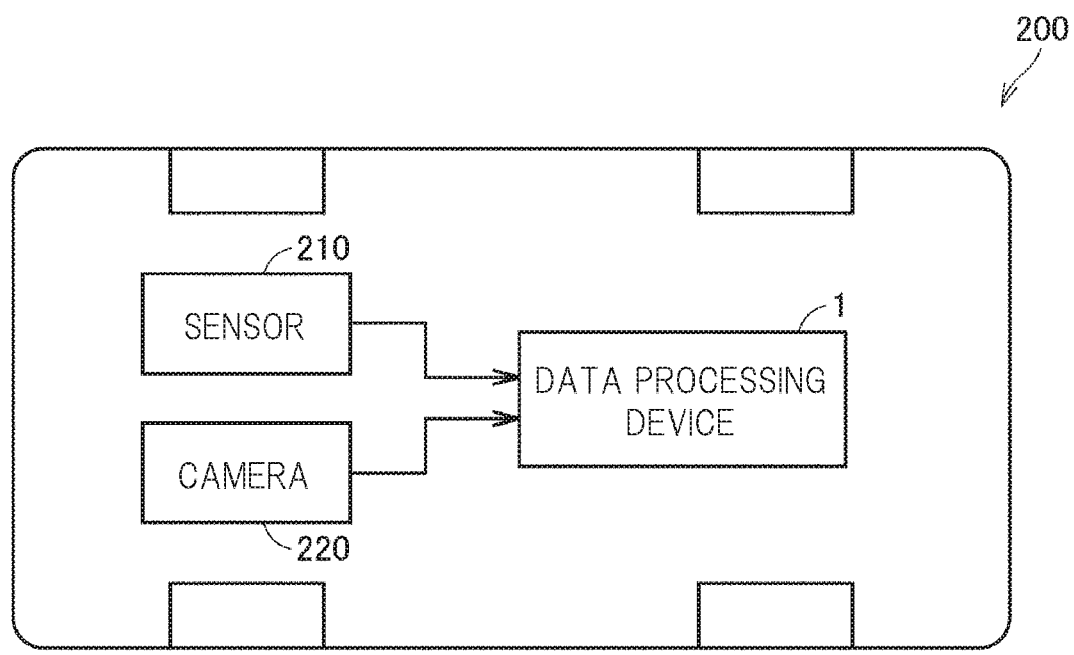
FIG. 1 is a block diagram illustrating an example of the configuration when a data processing device 1 according to Embodiment 1 is employed in a vehicle 200.

Embodiments are explained in detail, with reference to the attached drawings. In the following explanation, the same symbol or reference numeral is attached to the same element or the corresponding element and the repeated explanation thereof may be omitted.

Embodiment 1

FIG. 1 is a block diagram illustrating an example of the configuration when a data processing device 1 according to Embodiment 1 is employed in a vehicle 200.

With reference to FIG. 1, a data processing device 1, a sensor 210, and a camera 220 are provided in the vehicle 200. The data processing device 1 is a vehicle-mounted chip.

The sensor 210 acquires predetermined information on the vehicle 200.

The camera 220 acquires surrounding images of the vehicle 200.

The information acquired with the sensor 210 and the camera 220 is supplied to the data processing device 1.

The data processing device 1 performs predetermined processing corresponding to the information acquired with the sensor 210 and the camera 220. In the present example, various functions using a virtual machine VM are executed as an example.

Figure 2:
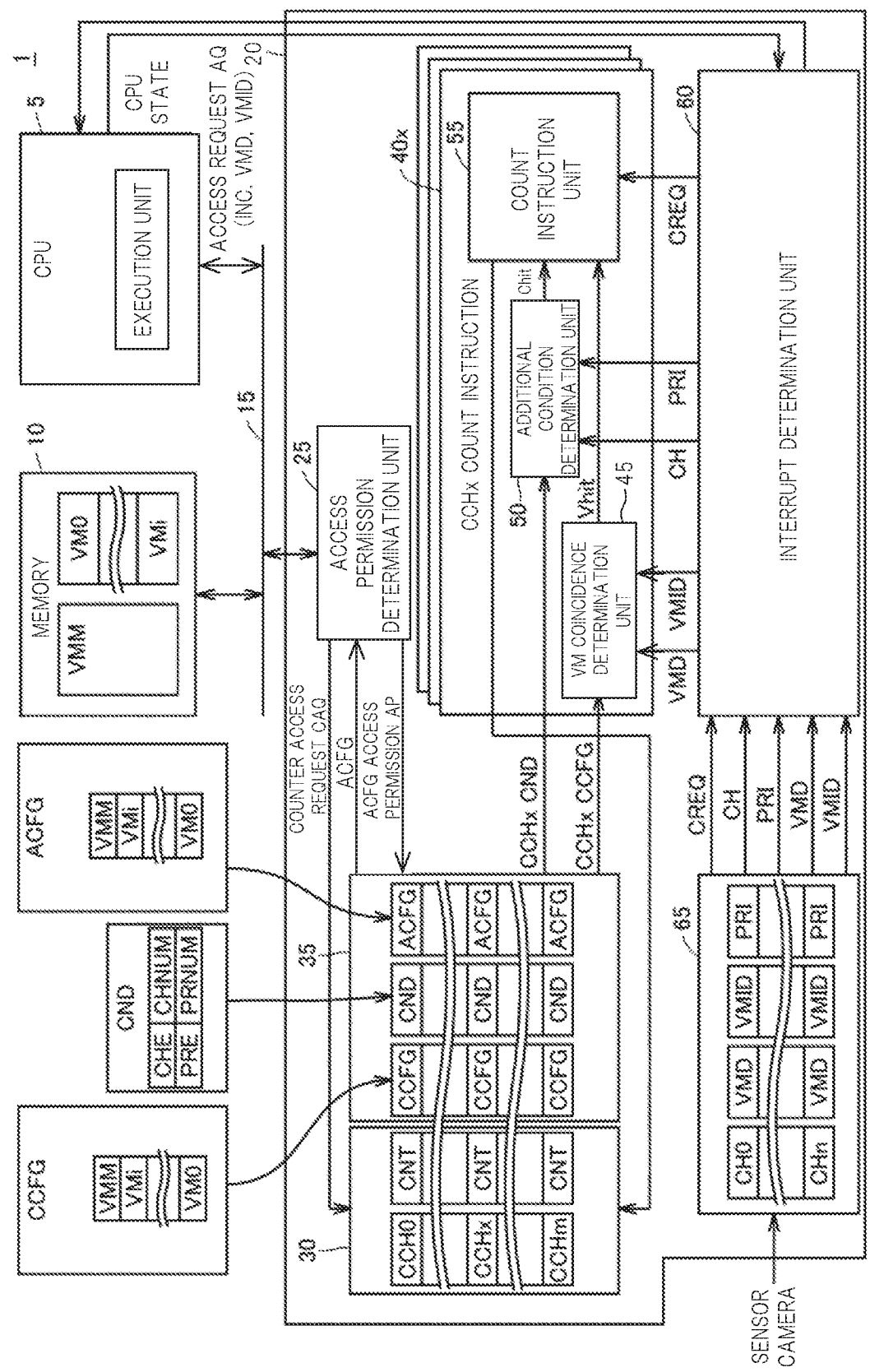
FIG. 2 is a drawing illustrating the data processing device 1 and its peripheral circuit according to Embodiment 1.

FIG. 2 is a drawing illustrating the data processing device 1 and its peripheral circuit according to Embodiment 1.

With reference to FIG. 2, the data processing device 1 includes a CPU 5, a memory 10, a data bus 15, and an interrupt controller 20.

The CPU 5 includes an execution unit. The execution unit reads a program for executing a virtual machine from the memory 10 and realizes the function of a virtual machine VM and a virtual machine monitor VMM. The present example illustrates, as an example, the case where the program for realizing the function of the virtual machines VM0-VMi is stored in the memory 10. The program for realizing the function of the virtual machine monitor VMM to manage the virtual machine VM is also stored in the memory 10.

The CPU 5 and the memory 10 transmit and receive data via the data bus 15. The CPU 5 and the interrupt controller 20 transmit and receive data also via the data bus 15.

The present example explains the configuration in which one piece of the memory 10 is provided. However, not restricted to the case in particular, it is also preferable to employ the configuration in which multiple memories are provided. The present example explains the case where the CPU 5 accesses the memory 10 via the data bus 15. However, not restricted to the case in particular, it is also preferable to provide another path through which the CPU 5 can access the memory directly, without passing through the data bus 15.

The CPU 5 outputs a state signal ST indicative of the state of the CPU 5 to the interrupt controller 20. The state signal ST concerned indicates whether the CPU 5 is ready to execute the interrupt processing. For example, the state signal ST of "1" indicates that the interrupt processing can be received, and the state signal ST of "0" indicates that the interrupt processing cannot be received. The above-described relation between the state and the value of the state signal ST is an example and they may be reversed.

When it is determined that the CPU 5 is ready to execute the interrupt processing based on the state signal ST, the interrupt controller 20 instructs the CPU 5 to execute the interrupt processing.

According to the instruction of the execution of the interrupt processing from the interrupt controller 20, the CPU 5 accesses the memory 10, reads a program for realizing the function of instructed virtual machines VM0-VMi or the virtual machine monitor VMM, and executes the program by use of the execution unit.

It is also preferable that the interrupt controller 20 may acquire multiple items of information indicative of the state of the CPU 5 via the state signal ST and that it may be determined whether the execution of the interrupt processing is possible, based on the information stored in an interrupt information storing unit 65 to be described below.

The interrupt controller 20 includes an access permission determination unit 25, a counter unit 30, a count condition setting unit 35, multiple counter control units 40, an interrupt information storing unit 65, and an interrupt determination unit 60.

The access permission determination unit 25 determines whether the access to the counter unit 30 or the count condition setting unit 35 is permissible. This processing is described below.

The counter unit 30 counts and stores the number of times CNT of the interrupt processing for each counter channel CCH. In the present example, (m+1) pieces of the counter channels CCH0-CCHm (hereinafter, they are collectively called the counter channel CCH) are provided. The number of times CNT of the interrupt processing is counted and stored in an associative manner with each counter channel CCH.

The count condition setting unit 35 sets up the count condition for the counter unit 30 to count the number of times of the interrupt processing. Specifically, the count condition is set up for each counter channel CCH. Specifically, the count condition includes count target setting information CCFG to set a virtual machine as the target to count, and count additional setting information CND that sets up the additional information at the time of counting. Aside from the count condition, an access condition is also setup for each counter channel CCH. Specifically, accessing target setting information ACFG to set the virtual machine as a permissible target at the time of accessing is included.

For example, the count target setting information CCFG is comprised of several bits. As an example, the top bit is assigned as setting information of the virtual machine monitor VMM. The subsequent bits are assigned as setting information of the virtual machines VMi-VM0. Therefore, when the top bit is set as "1", it indicates that the virtual machine monitor VMM is set as a count target in the counter channel CCH concerned. When the top bit is set as "0" on the other hand, it indicates that the virtual machine monitor VMM is not set as a count target in the counter channel CCH concerned. The same applies to the other bits.

Therefore, according to the count target setting information CCFG, the virtual machines VM0-VMi and the virtual machine monitor VMM serving as the count target in the counter channel CCH are set up. Here, the virtual machine serving as the count target is not restricted to one but multiple virtual machines can be set up.

The count additional setting information CND is comprised of several-bit data. Specifically, the count additional setting information CND includes channel specification data CHE, a channel number CHNUM, priority specification data PRE, and a priority number PRENUM.

The channel specification data CHE specifies whether the channel number is included as the count condition. For example, when the channel specification data CHE is set as "0", it indicates that the channel number is not included as the count condition. When the channel specification data CHE is set as "1", it indicates that the channel number is included as the count condition.

The channel number CHNUM is a bit to specify the channel number as the count condition when the channel number is included as the count condition (the channel specification data CHE ("1")). For example, when the channel number CHNUM is set as "0", it indicates that the channel number "0" is specified as the count condition. When the channel number CHNUM is set as "10", it indicates that the channel number "10" is specified as the count condition.

The priority specification data PRE specifies whether the priority number is included as the count condition. For example, when the priority specification data PRE is set as "0", it indicates that the priority number is not included as the count condition. When the priority specification data PRE is set as "1", it indicates that the priority number is included as the count condition.

When the priority number is included as the count condition (the priority specification data PRE ("1")), the priority number PRNUM specifies the priority number serving as the count condition. For example, when the priority number PRNUM is set as "0", it indicates that the priority number "0" is specified as the count condition. When the priority number PRNUM is set as "10", it indicates that the priority number "10" is specified as the count condition.

The accessing target setting information ACFG is comprised of several-bit data. As an example, the top bit is assigned as setting information of the virtual machine monitor VMM. The subsequent bits are assigned as setting information of the virtual machines VMi-VM0. Therefore, when the top bit is set as "1", it indicates that the virtual machine monitor VMM is set as an accessible virtual machine in the counter channel CCH concerned. When the top bit is set as "0" on the other hand, it indicates that the virtual machine monitor VMM is not set as an accessible virtual machine in the counter channel CCH concerned. The same applies to the other bits.

Therefore, according to the accessing target setting information ACFG, the virtual machines VM0-VMi and the virtual machine monitor VMM that are accessible in the counter channel CCH are set up. Here, not only one but multiple virtual machines may be set as the target of the accessible virtual machine.

The counter control unit 40 executes control in counting the number of times of the interrupt processing for each counter channel CCH, based on the count condition set by the count condition setting unit 35.

In the present example, (m+1) pieces of the counter channels CCH0-CCHm are provided, and the counter control unit 40 is also provided for each counter channel CCH.

In FIG. 2, for simplification of the explanation, the counter control unit 40x (also called collectively the counter control unit 40) provided corresponding to the counter channel CCHx is illustrated. The same applies to the other counter control unit 40.

The interrupt information storing unit 65 stores the interrupt information for each channel CH. In the present example, the channels CH0-CHn are provided, and the virtual machine information as an interrupt target is stored for each channel CH.

For example, a channel CH is assigned to each output information from a sensor or a camera, in advance. According to the output information from a sensor or a camera, the virtual machine information specified is stored to the pre-assigned channel CH of the interrupt information storing unit 65.

The interrupt information storing unit 65 outputs the stored information to the interrupt determination unit 60. Specifically, the interrupt information storing unit 65 outputs an interrupt request signal CREQ, a channel CH, virtual machine information (VMD, VMID), and priority data PRI to the interrupt determination unit 60.

In response to the information from the interrupt information storing unit 65, the interrupt determination unit 60 determines whether the interrupt processing is acceptable according to the state signal ST from the CPU 5.

When it is determined that the interrupt processing is acceptable according to the state signal ST from the CPU 5, the interrupt determination unit 60 instructs the execution of the interrupt processing to the CPU 5. The interrupt determination unit 60 outputs, to the CPU 5, the information including the channel CH and the virtual machine information, outputted from the interrupt information storing unit 65.

The interrupt determination unit 60 determines that the interrupt processing is acceptable when the state signal ST is "1", and outputs the information from the interrupt information storing unit 65 to the counter control unit 40. The interrupt determination unit 60 determines that the interrupt processing is not acceptable when the state signal ST is "0", and stands by until the state signal ST is set to "1." Then, the interrupt determination unit 60 outputs the information from the interrupt information storing unit 65 to the counter control unit 40, when the state signal ST is set to "1."

The interrupt determination unit 60 may acquire multiple items of information indicative of the state of the CPU 5 through the state signal ST, and may determine whether the execution of the interrupt processing is possible, based on the information stored in the interrupt information storing unit 65.

The counter control unit 40 includes a VM coincidence determination unit 45, an additional condition determination unit 50, and a count instruction unit 55.

The VM coincidence determination unit 45 determines whether the virtual machine information of which the interrupt processing is received is set as a count target of the count condition, based on the count target setting information CCFG set by the count condition setting unit 35 and the virtual machine information (VM, VMID) outputted from the interrupt determination unit 60.

When the VM coincidence determination unit 45 determines that the virtual machine information of which the interrupt processing is received is set as the count target of the count condition, based on the count target setting information CCFG set by the count condition setting unit 35 and the virtual machine information (VMD, VMID) outputted from the interrupt determination unit 60, the VM coincidence determination unit 45 outputs a coincidence signal Vhit to the count instruction unit 55.

For example, the coincidence signal Vhit of "1" indicates that the virtual machine information of which the interrupt processing is received is set as the count target of the count condition.

On the other hand, the coincidence signal Vhit of "0" indicates that the virtual machine information of which the interrupt processing is received is not set as the count target of the count condition.

The additional condition determination unit 50 determines whether the corresponding additional condition coincides with the virtual machine information of which the interrupt processing is received, based on the count additional setting information CND set by the count condition setting unit 35, and based on the channel CH and the priority data PRI that are outputted from the interrupt determination unit 60.

When the additional condition determination unit 50 determines that the corresponding additional condition coincides with the virtual machine information of which the interrupt processing is received, based on the count additional setting information CND set by the count condition setting unit 35, and based on the channel CH and the priority data PRI that are outputted from the interrupt determination unit 60, the additional condition determination unit 50 outputs a coincidence signal Chit to the count instruction unit 55.

The additional condition determination unit 50 does not necessarily need to perform the determination of the additional condition. When not performing the determination of the additional condition, the coincidence signal Chit is set as "1."

For example, the coincidence signal Chit of "1" indicates that the corresponding additional condition coincides with the virtual machine information of which the interrupt processing is received.

On the other hand, the coincidence signal Vhit of "0" indicates that the corresponding additional condition does not coincide with the virtual machine information of which the interrupt processing is received.

The count instruction unit 55 executes a count instruction operation according to the interrupt request signal CREQ. Specifically, the count instruction unit 55 outputs a count instruction signal of the counter channel CCH, based on the coincidence signal Vhit outputted from the VM coincidence determination unit 45 and the coincidence signal Chit outputted from the additional condition determination unit 50.

The counter unit 30 updates the number of times CNT of the corresponding counter channel CCH according to the count instruction signal. For example, the counter unit 30 increments and adds one to the number of times CNT.

The present example explains the configuration in which one interrupt information storing unit 65 is provided. However, it is also possible to adopt the configuration in which the interrupt information storing unit 65 is provided for each CPU, for example.

FIG. 3 illustrates count target setting information CCFG according to Embodiment 1.

With reference to FIG. 3, the count target setting information CCFG sets up whether a virtual machine is made as a count target.

As described above, the count target setting information CCFG provided for each counter channel CCH sets up a virtual machine serving as a count target of the counter channel CCH concerned.

Specifically, in the case where the bit of the target virtual machine is set as "1", the count is performed when the interrupt information for the event of the virtual machine serving as the target concerned is received. In the case where the bit of the target virtual machine is set as "0", the count is not performed when the interrupt information for the event of the virtual machine serving as the target concerned is received.

FIG. 4 illustrates virtual machine information according to Embodiment 1.

With reference to FIG. 4, the virtual machine information includes virtual machine management data VMD and virtual machine identification data VMID.

The virtual machine management data VMD identifies the virtual machine monitor VMM and the general virtual machine VM. Specifically, the virtual machine management data VMD of "0" indicates the virtual machine monitor VMM. On the other hand, the virtual machine management data VMD of "1" indicates the general virtual machine VM. Each general virtual machine VM can be identified by the virtual machine identification data VMID.

In the present example, for the virtual machine VM0, the virtual machine management data VMD is assigned "1", and the virtual machine identification data VMID is assigned "0." For the virtual machine VM1, the virtual machine management data VMD is assigned "1", and the virtual machine identification data VMID is assigned "1." For the virtual machine VM2, the virtual machine management data VMD is assigned "1", and the virtual machine identification data VMID is assigned "2." For the virtual machine VM3, the virtual machine management data VMD is assigned "1", and the virtual machine identification data VMID is assigned "3."

It is possible to identify each of the virtual machine VM and the virtual machine monitor VMM based on the virtual machine information concerned.

FIGS. 5A and 5B illustrate the configuration of a VM coincidence determination unit 45 according to Embodiment 1.

With reference to FIG. 5A, the VM coincidence determination unit 45 includes a virtual machine information determination unit 46.

The virtual machine information determination unit 46 identifies the virtual machine based on the virtual machine management data VMD and the virtual machine identification data VMID.

FIG. 5B illustrates a circuit to output a coincidence signal Vhit indicating that the virtual machine information of which the interrupt processing is received is a count target of the count condition.

With reference to FIG. 5B, the VM coincidence determination unit 45 further includes multiple AND circuits AD0-AD4 and an OR circuit OR0.

The AND circuits AD0-AD4 output an AND logical operation result of the determination result of the virtual machine information determination unit 46 and each bit of the count target setting information CCFG. Specifically, the virtual machine information determination unit 46 sets the determination result of the target virtual machine information as "1", based on the virtual machine management data VMD and the virtual machine identification data VMID. When a bit of the count target setting information CCFG is set as "1" and the determination result of the virtual machine information is "1", the corresponding AND circuit AD outputs "1" to the OR circuit OR0 and the coincidence signal Vhit is set as "1." That is, it is determined that the virtual machine information of which the interrupt processing is received is set as the count target of the count condition.

On the other hand, when the coincidence signal Vhit is "0", it is determined that the virtual machine information of which the interrupt processing is received is not set as the count target of the count condition.

Figure 6:
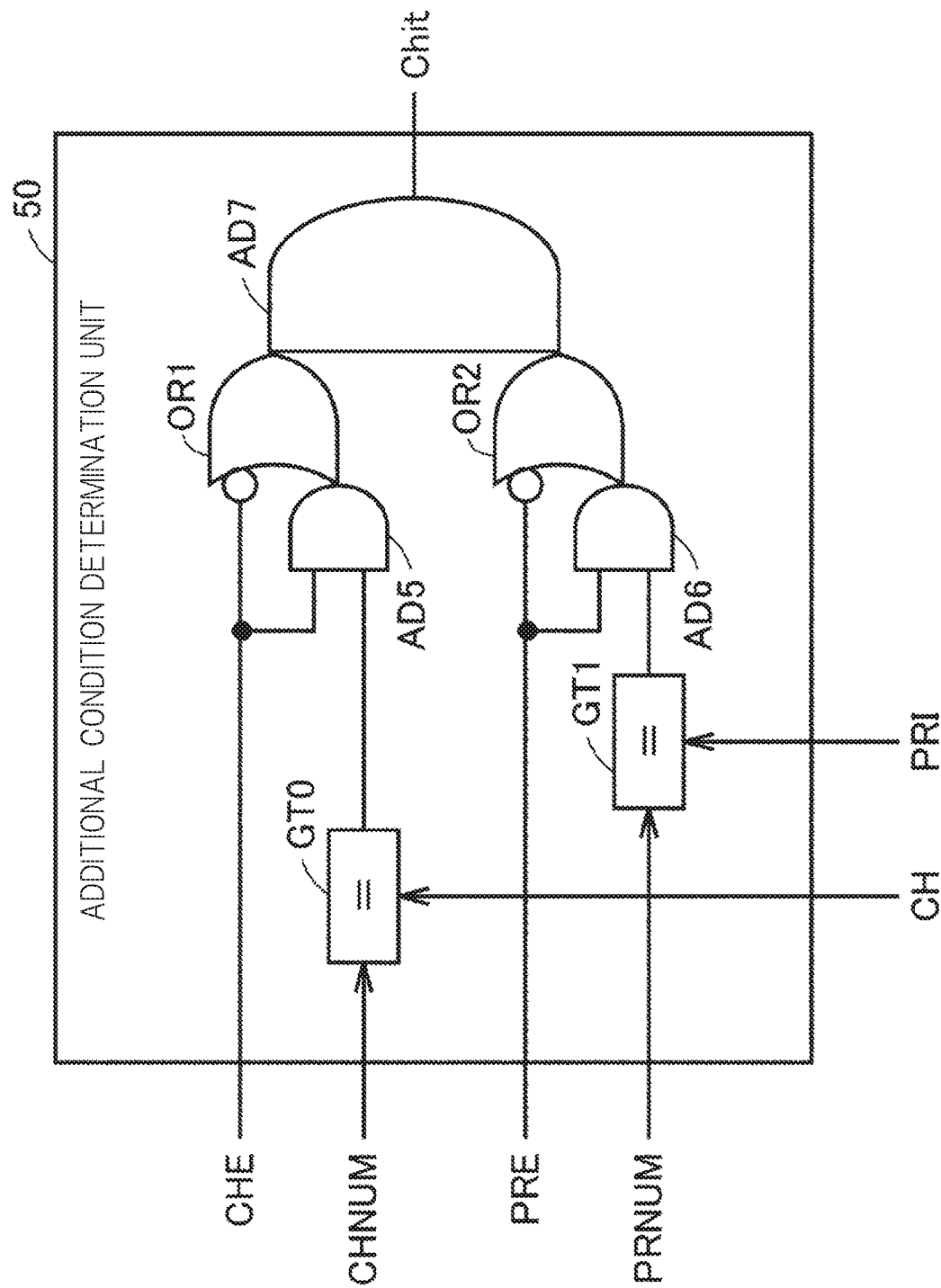
FIG. 6 is a drawing illustrating the configuration of an additional condition determination unit 50 according to Embodiment 1.

FIG. 6 illustrates the configuration of the additional condition determination unit 50 according to Embodiment 1.

With reference to FIG. 6, the additional condition determination unit 50 includes comparator circuits GT0 and GT1, AND circuits AD5, AD6 and AD7, and OR circuits OR1 and OR2.

The comparator circuit GT0 compares a specified channel number CHNUM with the data of channel CH outputted from the interrupt information storing unit 65 and determines whether they coincide or not.

When the comparator circuit GT0 determines that the data of the channel CH outputted from the interrupt information storing unit 65 coincides with the specified channel number CHNUM, the comparator circuit GT0 outputs "1." When the comparator circuit GT0 determines that they do not coincide, the comparator circuit GT0 outputs "0."

The comparator circuit GT1 compares the specified priority number PRNUM with the priority data PRI outputted from the interrupt information storing unit 65, and determines whether they coincide or not.

When the comparator circuit GT1 determines that the priority data PRI outputted from the interrupt information storing unit 65 coincides with the specified priority number PRNUM, the comparator circuit GT1 outputs "1." When the comparator circuit GT1 determines that they do not coincide, the comparator circuit GT1 outputs "0."

When the comparator circuit GT0 outputs "1" and the channel specification data CHE is "1", the AND circuit AD5 outputs an AND logical operation result ("1").

Otherwise, the AND circuit AD5 outputs an AND logical operation result ("0").

The OR circuit OR1 receives the output signal from the AND circuit AD5 and the inverted data of the channel specification data CHE and outputs an OR logical operation result to the AND circuit AD7.

When the comparator circuit GT1 outputs "1" and the priority specification data PRE is "1", the AND circuit AD6 outputs an AND logical operation result ("1").

Otherwise, the AND circuit AD6 outputs an AND logical operation result ("0").

The OR circuit OR2 receives the output signal from the AND circuit AD6 and the inverted data of the priority specification data PRE and outputs an OR logical operation result to the AND circuit AD7.

The AND circuit AD7 outputs an AND logical operation result of the OR circuits OR1 and OR2.

When the channel specification data CHE is "0" and the priority specification data PRE is "0", both OR circuits OR1 and OR2 output "1." Therefore, the AND circuit AD7 sets the coincidence signal Chit as "1." In this case, the condition determination processing of the additional condition determination unit 50 is not performed.

On the other hand, when the channel specification data CHE is "1", the condition determination processing of whether the data of the channel CH coincides with the specified channel number CHNUM is performed. When the priority specification data PRE is "1", the condition determination processing of whether the priority data PRI coincides with the specified priority number PRNUM is performed.

When the condition determination processing performed indicates coincidence, the additional condition determination unit 50 sets the coincidence signal Chit as "1." When the condition determination processing performed does not indicate coincidence, the additional condition determination unit 50 sets the coincidence signal Chit as "0." In this case, the count instruction signal is not outputted.

Figure 7:
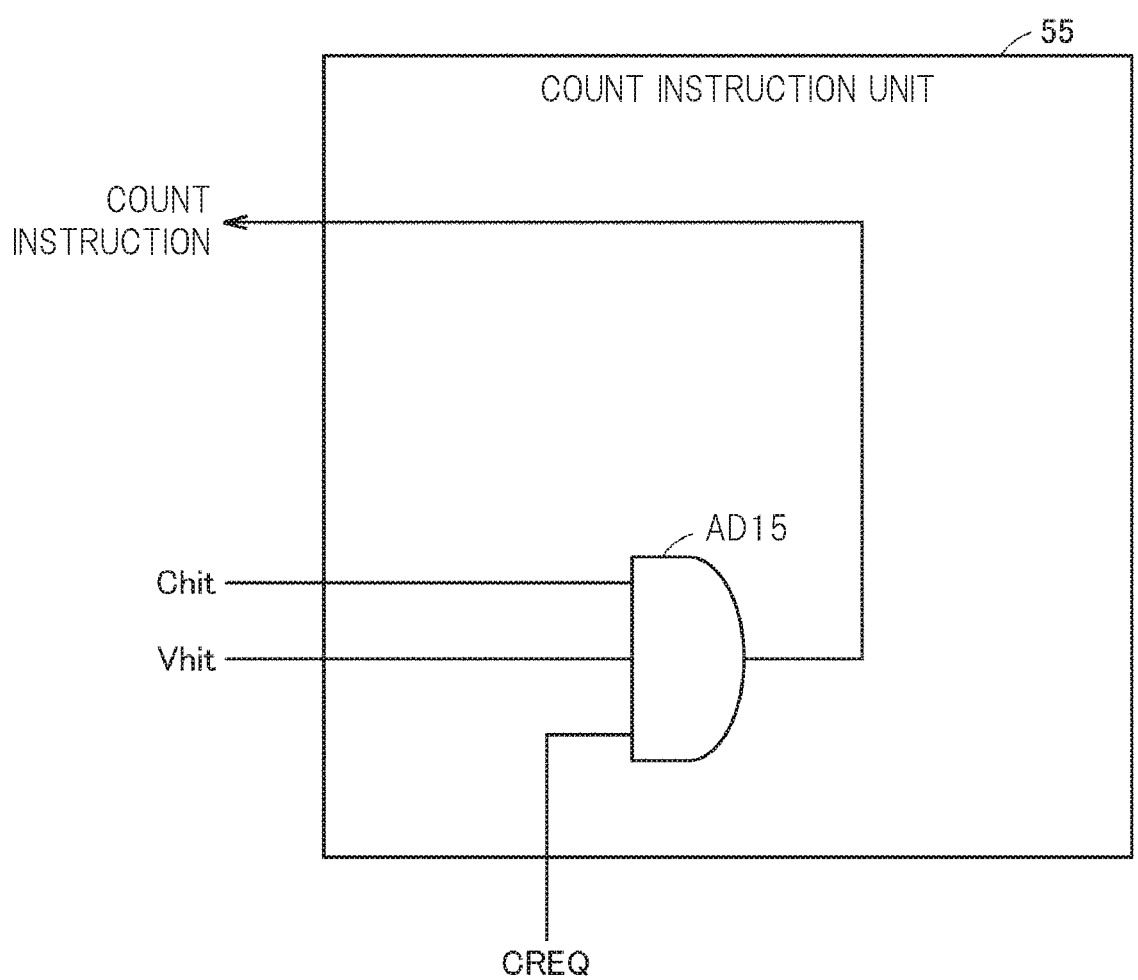
FIG. 7 is a drawing illustrating the configuration of a count instruction unit 55 according to Embodiment 1.

FIG. 7 illustrates the configuration of the count instruction unit 55 according to Embodiment 1.

As illustrated in FIG. 7, the count instruction unit 55 includes an AND circuit AD15.

The AND circuit AD7 instructs counting, based on the coincidence signal Chit, the coincidence signal Vhit, and the interrupt request signal CREQ.

Specifically, the count instruction unit 55 sets the count instruction signal as "1", when all of the coincidence signal Chit, the coincidence signal Vhit, and the interrupt request signal CREQ are "1." Otherwise, the count instruction unit 55 sets the count instruction signal as "0." The counter unit 30 updates the number of times CNT of the corresponding counter channel CCH according to the count instruction signal ("1") outputted from the count instruction unit 55. The counter unit 30 increments and adds one to the number of times CNT, as an example.

Concrete Example

FIGS. 8A, 8B, and 8C illustrate a concrete example of the count processing according to Embodiment 1.

FIG. 8A illustrates an example of the interrupt information storing unit 65.

Specifically, FIG. 8A illustrates the case where the interrupt information corresponding to the channels CH10, CH11, CH20, and CH21 is received.

Here, corresponding to the channel CH10, the virtual machine management data VMD is set as "1" and the virtual machine identification data VMID is set as "0."

Corresponding to the channel CH11, the virtual machine management data VMD is set as "1" and the virtual machine identification data VMID is set as "0."

Corresponding to the channel CH20, the virtual machine management data VMD is set as "1" and the virtual machine identification data VMID is set as "1."

Corresponding to the channel CH21, the virtual machine management data VMD is set as "1" and the virtual machine identification data VMID is set as "1."

FIG. 8B illustrates an example of the counter unit 30 and the count condition setting unit 35.

Specifically, the counter channels CCH0-CCH3 are set to the counter unit 30. As for the count target setting information CCFG corresponding to the counter channel CCH0, only the virtual machine VM0 is set as "1." As for the count target setting information CCFG corresponding to the counter channel CCH1, only the virtual machine VM0 is set as "1." As for the count additional setting information CND, the channel specification data CHE is set as "1." The channel number CHNUM is set as "10." As for the count target setting information CCFG corresponding to the counter channel CCH2, only the virtual machine VM1 is set as "1." As for the count target setting information CCFG corresponding to the counter channel CCH3, only the virtual machine VM1 is set as "1." As for the count additional setting information CND, the channel specification data CHE is set as "1." The channel number CHNUM is set as "20."

FIG. 8C illustrates the count processing of the counter channel CCHx for the interrupt information storing unit 65 illustrated in FIG. 8A.

The interrupt processing corresponding to the channel CH10 is explained.

In the counter control unit 40 provided corresponding to the counter channel CCH0, the VM coincidence determination unit 45 outputs a coincidence signal Vhit ("1") to the count instruction unit 55. The additional condition determination unit 50 outputs a coincidence signal Chit ("1") to the count instruction unit 55. The count instruction unit 55 outputs a count instruction signal of the counter channel CCH0, based on the coincidence signal Vhit ("1") outputted from the VM coincidence determination unit 45 and the coincidence signal Chit ("1") outputted from the additional condition determination unit 50. Accordingly, the number of times CNT of the counter channel CCH0 is updated.

In the counter control unit 40 provided corresponding to the counter channel CCH1, the VM coincidence determination unit 45 outputs a coincidence signal Vhit ("1") to the count instruction unit 55.

The additional condition determination unit 50 compares the specified channel number CHNUM with the data of the channel CH outputted from the interrupt information storing unit 65, and determines that they coincide. Therefore, the coincidence signal Chit ("1") is outputted to the count instruction unit 55. The count instruction unit 55 outputs a count instruction signal of the counter channel CCH1, based on the coincidence signal Vhit ("1") outputted from the VM coincidence determination unit 45 and the coincidence signal Chit ("1") outputted from the additional condition determination unit 50. Accordingly, the number of times CNT of the counter channel CCH1 is updated.

The counter control unit 40 provided corresponding to other counter channels CCHx does not output a count instruction signal.

Next, the interrupt processing corresponding to the channel CH11 is explained.

In the counter control unit 40 provided corresponding to the counter channel CCH0, the VM coincidence determination unit 45 outputs a coincidence signal Vhit ("1") to the count instruction unit 55. The additional condition determination unit 50 outputs a coincidence signal Chit ("1") to the count instruction unit 55. The count instruction unit 55 outputs a count instruction signal of the counter channel CCH0, based on the coincidence signal Vhit ("1") outputted from the VM coincidence determination unit 45 and the coincidence signal Chit ("1") outputted from the additional condition determination unit 50. Accordingly, the number of times CNT of the counter channel CCH0 is updated.

In the counter control unit 40 provided corresponding to the counter channel CCH1, the VM coincidence determination unit 45 outputs a coincidence signal Vhit ("1") to the count instruction unit 55.

The additional condition determination unit 50 compares the specified channel number CHNUM with the data of the channel CH outputted from the interrupt information storing unit 65, and determines that they do not coincide. Therefore, the additional condition determination unit 50 outputs a coincidence signal Chit ("0") to the count instruction unit 55. The count instruction unit 55 does not output the count instruction signal of the counter channel CCH1, based on the coincidence signal Vhit ("1") outputted from the VM coincidence determination unit 45 and the coincidence signal Chit ("0") outputted from the additional condition determination unit 50. Accordingly, the number of times CNT of the counter channel CCH1 is not updated.

Also as for the counter control unit 40 provided corresponding to other counter channels CCHx, the count instruction signal is not outputted The interrupt processing corresponding to the channel CH20 is explained.

In the counter control unit 40 provided corresponding to the counter channel CCH2, the VM coincidence determination unit 45 outputs a coincidence signal Vhit ("1") to the count instruction unit 55. The additional condition determination unit 50 outputs a coincidence signal Chit ("1") to the count instruction unit 55. The count instruction unit 55 outputs a count instruction signal of the counter channel CCH2, based on the coincidence signal Vhit ("1") outputted from the VM coincidence determination unit 45 and the coincidence signal Chit ("1") outputted from the additional condition determination unit 50. Accordingly, the number of times CNT of the counter channel CCH2 is updated.

In the counter control unit 40 provided corresponding to the counter channel CCH3, the VM coincidence determination unit 45 outputs a coincidence signal Vhit ("1") to the count instruction unit 55.

The additional condition determination unit 50 compares the specified channel number CHNUM with the data of the channel CH outputted from the interrupt information storing unit 65, and determines that they coincide. Therefore, the coincidence signal Chit ("1") is outputted to the count instruction unit 55. The count instruction unit 55 outputs a count instruction signal of the counter channel CCH3, based on the coincidence signal Vhit ("1") outputted from the VM coincidence determination unit 45 and the coincidence signal Chit ("1") outputted from the additional condition determination unit 50. Accordingly, the number of times CNT of the counter channel CCH3 is updated.

The counter control unit 40 provided corresponding to other counter channels CCHx does not output a count instruction signal.

Next, the interrupt processing corresponding to the channel CH21 is explained.

In the counter control unit 40 provided corresponding to the counter channel CCH2, the VM coincidence determination unit 45 outputs a coincidence signal Vhit ("1") to the count instruction unit 55. The additional condition determination unit 50 outputs a coincidence signal Chit ("1") to the count instruction unit 55. The count instruction unit 55 outputs a count instruction signal of the counter channel CCH2, based on the coincidence signal Vhit ("1") outputted from the VM coincidence determination unit 45 and the coincidence signal Chit ("1") outputted from the additional condition determination unit 50. Accordingly, the number of times CNT of the counter channel CCH2 is updated.

In the counter control unit 40 provided corresponding to the counter channel CCH3, the VM coincidence determination unit 45 outputs a coincidence signal Vhit ("1") to the count instruction unit 55.

The additional condition determination unit 50 compares the specified channel number CHNUM with the data of the channel CH outputted from the interrupt information storing unit 65, and determines that they do not coincide. Therefore, the additional condition determination unit 50 outputs a coincidence signal Chit ("0") to the count instruction unit 55. The count instruction unit 55 does not output the count instruction signal of the counter channel CCH3, based on the coincidence signal Vhit ("1") outputted from the VM coincidence determination unit 45 and the coincidence signal Chit ("0") outputted from the additional condition determination unit 50. Accordingly, the number of times CNT of the counter channel CCH3 is not updated.

Also as for the counter control unit 40 provided corresponding to other counter channels CCHx, the count instruction signal is not outputted (On Accessing of the Counter Channel CCHx)

Figure 9:
FIG. 9 is a drawing illustrating accessing target setting information ACFG according to Embodiment 1.

FIG. 9 illustrates accessing target setting information ACFG according to Embodiment 1.

With reference to FIG. 9, the accessing target setting information ACFG determines whether the virtual machine is set as an accessing target.

As described above, the accessing target setting information ACFG provided for each counter channel CCH sets up the virtual machine serving as the accessing target of the counter channel CCH concerned.

Specifically, when the bit of the target virtual machine is set as "1", the virtual machine as the target concerned can access the information corresponding to the counter channel CCH. Specifically, it is also possible to change the contents of the count target setting information CCFG and the count additional setting information CND. On the other hand, when the bit of the target virtual machine is set as "0", the virtual machine as the target concerned cannot access the information corresponding to the counter channel CCH.

Figure 10:
FIG. 10 is a drawing illustrating virtual machine information used in an access permission determination unit 25 according to Embodiment 1.

FIG. 10 illustrates virtual machine information used in the access permission determination unit 25 according to Embodiment 1.

With reference to FIG. 10, the virtual machine information includes virtual machine management data VMD and virtual machine identification data VMID. It is the same as what is explained with reference to FIG. 4.

The virtual machine management data VMD identifies the virtual machine monitor VMM and the general virtual machine VM. Specifically, the virtual machine management data VMD of "0" indicates the virtual machine monitor VMM. On the other hand, the virtual machine management data VMD of "1" indicates the general virtual machine VM. The general virtual machine VM can be identified respectively by the virtual machine identification data VMID.

In the present example, for the virtual machine VM0, the virtual machine management data VMD is assigned "1", and the virtual machine identification data VMID is assigned "0." For the virtual machine VM1, the virtual machine management data VMD is assigned "1", and the virtual machine identification data VMID is assigned "1." For the virtual machine VM2, the virtual machine management data VMD is assigned "1", and the virtual machine identification data VMID is assigned "2." For the virtual machine VM3, the virtual machine management data VMD is assigned "1", and the virtual machine identification data VMID is assigned "3."

It is possible to identify each of the virtual machine VM and the virtual machine monitor VMM based on the virtual machine information concerned.

Figure 11:
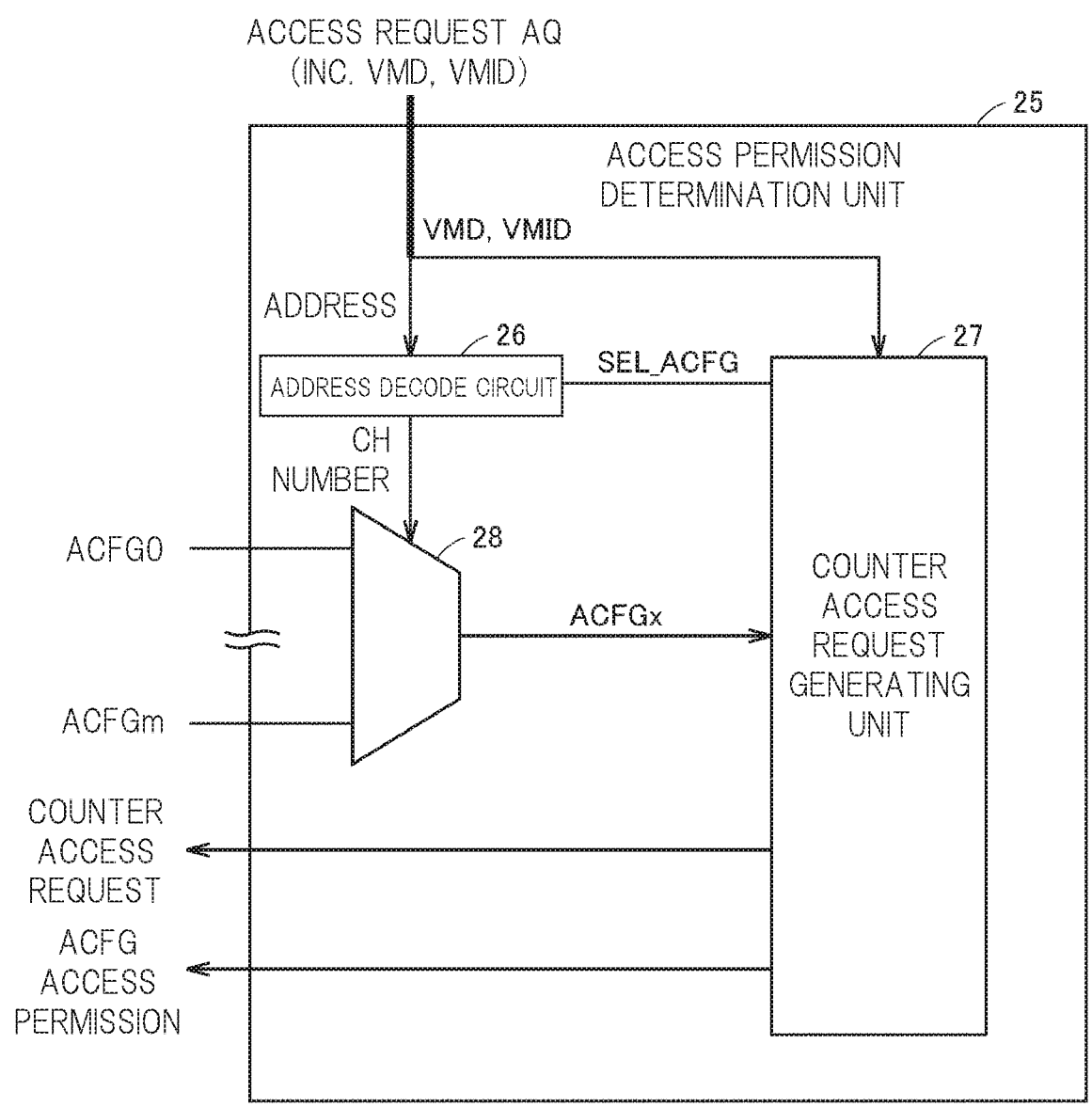
FIG. 11 is a drawing illustrating the configuration of the access permission determination unit 25 according to Embodiment 1.

FIG. 11 illustrates the configuration of the access permission determination unit 25 according to Embodiment 1.

With reference to FIG. 11, the access permission determination unit 25 includes an address decode circuit 26, a counter access request generating unit 27, and a selector 28.

The address decode circuit 26 receives and decodes an access request AQ.

The address decode circuit 26 extracts a counter channel number based on an address signal included in the access request AQ.

The counter access request generating unit 27 further receives the virtual machine information regarding the virtual machine that has outputted the access request AQ. The virtual machine information includes the virtual machine management data VMD and the virtual machine identification data VMID.

The address decode circuit 26 generates a counter channel number CCHx and a selection signal SEL_ACFG, based on the inputted address signal.

The address decode circuit 26 outputs a selection signal SEL_ACFG to the counter access request generating unit 27.

The counter access request generating unit 27 identifies a virtual machine based on the virtual machine management data VMD and the virtual machine identification data VMID.

Then, regarding the identified virtual machine, it is determined whether the bit of the target virtual machine is set as "1" in the accessing target setting information ACFG.

The counter access request generating unit 27 outputs a determination result to the counter unit 30 as the counter access request signal CAQ ("1").

The counter unit 30 outputs the number of times CNT according to the counter access request signal CAQ. Specifically, the counter unit 30 outputs the number of times CNT via the data bus 15 to the accessed virtual machine.

The counter access request generating unit 27 permits the access permission signal AP to the accessing target setting information ACFG, according to the accessing target setting information ACFG.

When the access permission signal AP ("1") is set up, it is possible to edit the data of the accessing target setting information ACFG.

FIGS. 12A and 12B illustrate the configuration of the counter access request generating unit 27 according to Embodiment 1.

As illustrated in FIG. 12A, the counter access request generating unit 27 includes a virtual access machine information determination unit 27A.

The virtual access machine information determination unit 27A identifies the virtual machine to be accessed, based on the virtual machine management data VMD and the virtual machine identification data VMID.

The virtual access machine information determination unit 27A sets as "1" the determination result of the virtual machine information that has been accessed, based on the virtual machine management data VMD and the virtual machine identification data VMID.

As illustrated in FIG. 12B, the counter access request generating unit 27 further includes an access determination unit 27B.

The access determination unit 27B further includes multiple AND circuits AD8-AD14 and an OR circuit OR3."

The AND circuits AD9-AD13 output an AND logical operation result of the determination result of the virtual access machine information determination unit 27A and each bit of the accessing target setting information ACFG. Specifically, the virtual access machine information determination unit 27A sets as "1" the determination result of the virtual machine information that has accessed, based on the virtual machine management data VMD and the virtual machine identification data VMID. When one of the bits of the accessing target setting information ACFG is set as "1" and the determination result of the virtual machine information to access is "1", the AND circuit AD outputs "1" to the OR circuit OR3.

The AND circuit AD14 outputs an AND logical operation result of the output signal of the OR circuit OR3 and a counter access request command IAQ, as the counter access request signal CAQ.

The counter unit 30 outputs the number of times CNT according to the counter access request signal CAQ.

The AND circuit AD8 outputs an AND logical operation result of the bit signal provided corresponding to the virtual machine monitor (VMM) stored in the accessing target setting information ACFG and the selection signal SEL_ACFG, as the access permission signal AP to the accessing target setting information ACFG.

When the access permission signal AP is set as "1", it is possible to access the accessing target setting information ACFG. On the other hand, when the access permission signal AP is set as "0", it is not possible to access the accessing target setting information ACFG.

Concrete Example

FIGS. 13A and 13B illustrate a concrete example of access processing according to Embodiment 1.

FIG. 13A illustrates an example of the counter unit 30 and the count condition setting unit 35.

Specifically, counter channels CCH0 and CCH1 are set to the counter unit 30. As for the accessing target setting information ACFG corresponding to the counter channel CCH0, only the virtual machine VM0 is set as "1." As for the accessing target setting information ACFG corresponding to the counter channel CCH1, only the virtual machine monitor VMM and the virtual machine VM1 are set as "1."

With reference to FIG. 13B, the access processing according to the accessing target setting information described in FIG. 13A is explained.

Here, the explanation is made for the case where the virtual machine monitor VMM and the virtual machines VM0 and VM1 make access.

The virtual machine monitor VMM is explained.

For the counter channel CCH0, the access is from the virtual machine monitor VMM; accordingly, the access permission signal AP is set as "1." Therefore, the access to the accessing target setting information ACFG is permitted. On the other hand, the access to other information except the accessing target setting information ACFG is not permitted.

For the counter channel CCH1, the access is from the virtual machine monitor VMM; accordingly, the access permission signal AP is set as "1." Therefore, the access to the accessing target setting information ACFG is permitted. On the other hand, the access permit of the virtual machine monitor VMM itself is set to the accessing target setting information ACFG. Accordingly, the access to the accessing target setting information ACFG is permitted.

The virtual machine VM0 is explained.

For the counter channel CCH0, the access is from the virtual machine VM0, the counter access request signal CAQ is set as "1." Therefore, the access to the counter unit 30 is permitted according to the counter access request signal ("1"). On the other hand, the access to the accessing target setting information ACFG is not permitted.

For the counter channel CCH1, the access is from the virtual machine VM0, the counter access request signal CAQ is set as "0." Therefore, the access to the counter unit 30 is not permitted. Also the access to the accessing target setting information ACFG is not permitted.

The virtual machine VM1 is explained.

For the counter channel CCH0, the access is from the virtual machine VM1, the counter access request signal CAQ is set as "0." Therefore, the access to the counter unit 30 is not permitted. Also the access to the accessing target setting information ACFG is not permitted.

For the counter channel CCH1, the access is from the virtual machine VM1, the counter access request signal CAQ is set as "1." Therefore, the access to the counter unit 30 is permitted. On the other hand, the access to the accessing target setting information ACFG is not permitted.

By setting the accessing target setting information ACFG according to the method described above, it is possible to perform the access control to the information concerned for each virtual machine. In the method concerned, the access permission is determined not by reading the accessing target setting information ACFG concerned, but by the access permission determination unit 25. Accordingly, it is possible to perform the determination of the access permission at high speed.

In the method according to Embodiment 1, the virtual machine monitor VMM does not need to execute the interrupt processing for executing the count processing, and when the interrupt processing is executed for the virtual machine VM, the count processing is executed in parallel.

Therefore, it is possible to monitor properly the number of times of the interrupt processing of the specific channel or the priority of each virtual machine VM, without sacrificing the interrupt processing performance.

For example, it is also possible to realize the safety mechanism such that a virtual machine VM generating excessive interrupt requests is determined to be in an abnormal state and is brought to termination.

Furthermore, it is possible to set up freely a virtual machine VM as the count target. Therefore, it is not necessary to necessarily provide a counter for each virtual machine VM, and useless hardware resources are not required, compared with the case where a counter is provided for each virtual machine VM. This is also one of the advantages.

The function to restrict the access to the counter unit is also included. By restricting the access to the virtual machine monitor VMM, it is possible to count the number of times of the interrupt occurrence properly, without being affected by a virtual machine VM that has fallen into the abnormal state.

By setting the access permission to a specific virtual machine VM, it also becomes possible to realize the safety mechanism such that the virtual machine VM monitors the own number of times of the interrupt occurrence, enabling the flexible processing.

Embodiment 2

Figure 14:
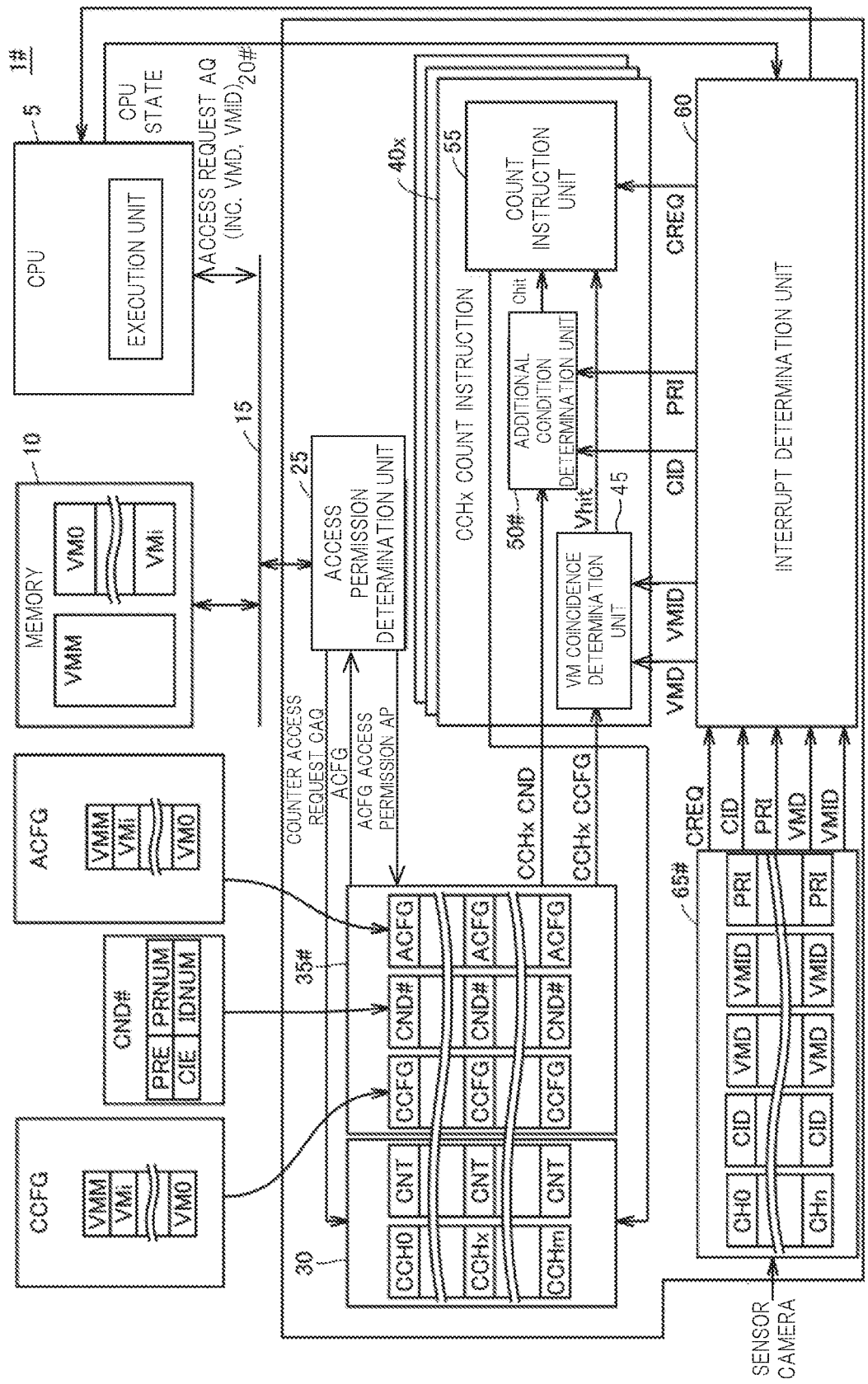
FIG. 14 is a drawing illustrating a data processing device 1 # and its peripheral circuit according to Embodiment 2.

FIG. 14 illustrates a data processing device 1 # and its peripheral circuit according to Embodiment 2.

With reference to FIG. 14, the data processing device 1 # is different from the data processing device 1 in that the interrupt controller 20 is replace with an interrupt controller 20 #. The other configurations are the same as those explained with reference to FIG. 2 in Embodiment 1. Therefore, the detailed explanation thereof is not repeated.

The interrupt controller 20 # is different from the interrupt controller 20 in that the count condition setting unit 35 is replaced with a count condition setting unit 35 #, the interrupt information storing unit 65 is replaced with an interrupt information storing unit 65 #, and the additional condition determination unit 50 is replaced with an additional condition determination unit 50 #. The other configurations are the same. Therefore, the detailed explanation thereof is not repeated.

The count condition setting unit 35 # is different in the configuration of the count additional setting information CND # as compared with the count condition setting unit 35.

The count additional setting information CND # is comprised of several-bit data. Specifically, the count additional setting information CND # is different in that channel identification specifying data CIE and a channel identification number IDNUM are provided instead of the channel specification data CHE and the channel number CHNUM. The priority specification data PRE and the priority number PRENUM are the same as described above.

The channel identification specifying data CIE specifies whether the channel identification number is included as the count condition. For example, when the channel identification specifying data CIE is set as "0", it indicates that the channel identification number is not included as the count condition. When the channel identification specifying data CIE is set as "1", it indicates that the channel identification number is included as the count condition.

The channel identification number IDNUM is a bit to specify the channel identification number as the count condition when the channel identification number is included as the count condition (the channel identification specifying data CIE ("1")). For example, when the channel identification number IDNUM is set as "0", it indicates that the channel identification number "0" is specified as the count condition. When the channel identification number IDNUM is set as "10", it indicates that the channel identification number "10" is specified as the count condition.

In the present example, by assigning the same channel identification number for a different channel CH, it is possible to perform the count processing as the same group.

The interrupt information storing unit 65 # indicates the case where the channel identification number CID is further associated, as compared with the interrupt information storing unit 65.

Specifically, the channel identification number CID is assigned corresponding to each channel CH.

Figure 15:
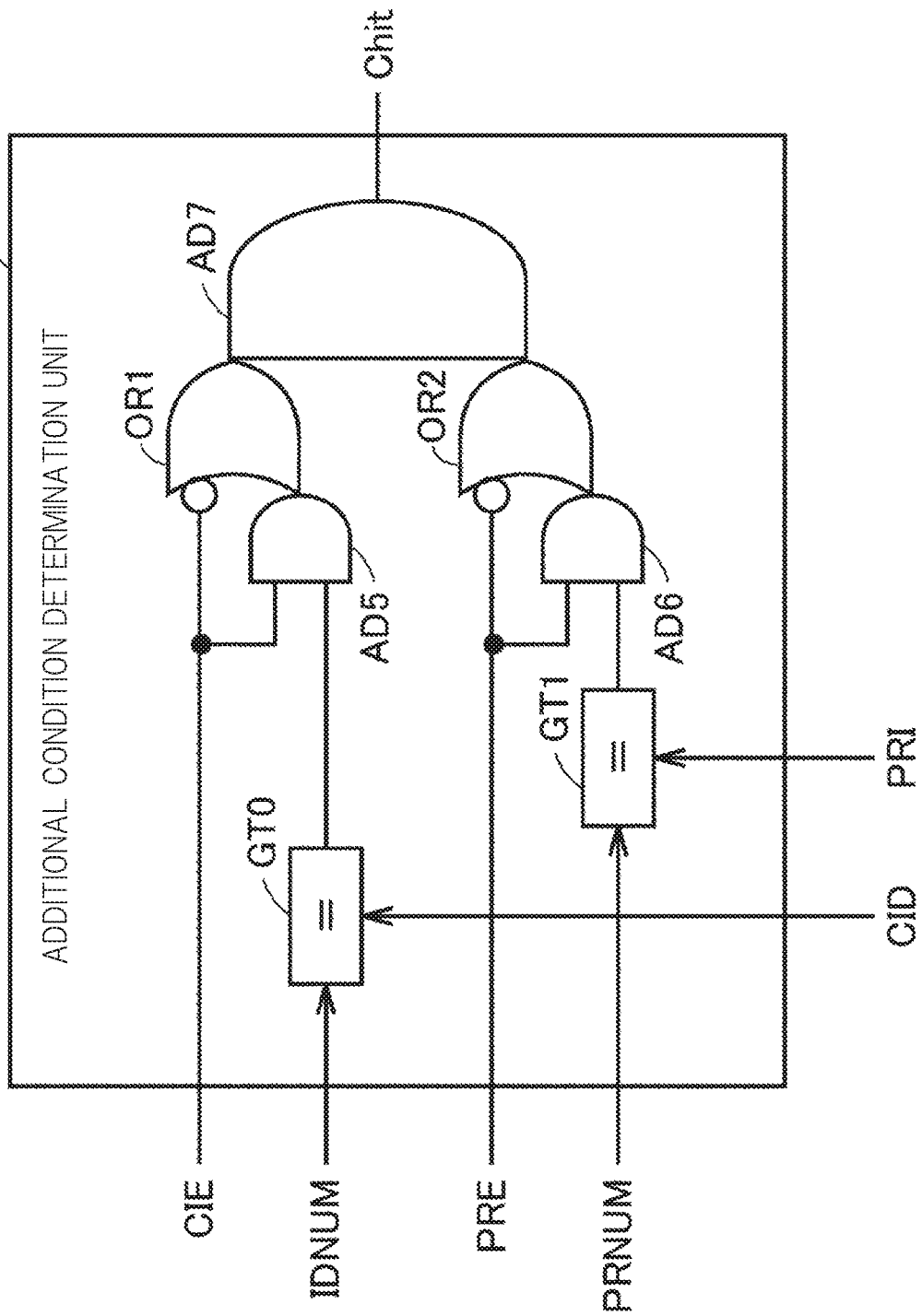
FIG. 15 is a drawing illustrating the configuration of an additional condition determination unit 50 # according to Embodiment 2.

FIG. 15 illustrates the configuration of the additional condition determination unit 50 # according to Embodiment 2.

As illustrated in FIG. 15, the data to be inputted is different as compared with the configuration illustrated in FIG. 6.

Specifically, the channel identification specifying data CIE is inputted instead of the channel specification data CHE. The channel identification number IDNUM is inputted instead of the channel number CHNUM. The channel identification number CID is inputted instead of the channel CH.

The comparator circuit GT0 compares a specified channel identification number IDNUM with the data of the channel identification number CID outputted from the interrupt information storing unit 65 #, and determines whether they coincide or not.

When the comparator circuit GT0 determines that the data of the channel identification number CID outputted from the interrupt information storing unit 65 # coincides with the specified channel identification number IDNUM, the comparator circuit GT0 outputs "1." When the comparator circuit GT0 determines that they do not coincide, the comparator circuit GT0 outputs "0."

When the comparator circuit GT0 outputs "1" and the channel identification specifying data CIE is "1", the AND circuit AD5 outputs an AND logical operation result ("1").

Otherwise, the comparator circuit GT0 outputs an AND logical operation result ("0").

The OR circuit OR1 receives the output signal from the AND circuit AD5 and the inverted data of the channel identification specifying data CIE and outputs an OR logical operation result to the AND circuit AD7.

The other configurations are the same as those explained in FIG. 6. Therefore, the detailed explanation thereof is not repeated.

The additional condition determination unit 50 # compares the channel identification number IDNUM with the channel identification number CID outputted from the interrupt information storing unit 65 #, and outputs a coincidence signal Chit based on the comparison result.

Therefore, even when the channel CH is different, it is possible to perform the count processing as the same group as far as the channel identification number CID is set as the common value.

Concrete Example

FIGS. 16A, 16B, and 16C illustrate a concrete example of count processing according to Embodiment 2.

FIG. 16A illustrates an example of the interrupt information storing unit 65 #.

Specifically, FIG. 16A illustrates the case where the interrupt information corresponding to the channels CH0, CH10, CH11, CH20, and CH21 is received.

Here, corresponding to the channel CH0, the virtual machine management data VMD is set as "0" and the virtual machine identification data VMID is set as "0." The channel identification number CID is set as "0."

Corresponding to the channel CH10, the virtual machine management data VMD is set as "1" and the virtual machine identification data VMID is set as "0." The channel identification number CID is set as "0."

Corresponding to the channel CH11, the virtual machine management data VMD is set as "1" and the virtual machine identification data VMID is set as "0." The channel identification number CID is set as "1."

Corresponding to the channel CH20, the virtual machine management data VMD is set as "1" and the virtual machine identification data VMID is set as "0." The channel identification number CID is set as "2."

Corresponding to the channel CH21, the virtual machine management data VMD is set as "1" and the virtual machine identification data VMID is set as "0." The channel identification number CID is set as "2."

FIG. 16B illustrates an example of the count condition setting unit 35 #.

Specifically, counter channels CCH0-CCH2 are provided in the counter unit 30.

As for the count target setting information CCFG corresponding to the counter channel CCH0, only the virtual machine VM0 is set as "1." The channel identification specifying data CIE of the count additional setting information CND # is set as "0."

As for the count target setting information CCFG corresponding to the counter channel CCH1, only the virtual machine VM0 is set as "1." The channel identification specifying data CIE of the count additional setting information CND # is set as "1." The channel identification number IDNUM is set as "1."

As for the count target setting information CCFG corresponding to the counter channel CCH2, only the virtual machine VM0 is set as "1." The channel identification specifying data CIE of the count additional setting information CND # is set as "1." The channel identification number IDNUM is set as "2."

FIG. 16C illustrates the count processing of the counter channel CCHx for the interrupt information storing unit 65 # illustrated in FIG. 16A.

The interrupt processing corresponding to the channel CH0 is explained.

In the counter control unit 40 provided corresponding to the counter channel CCH0, the VM coincidence determination unit 45 outputs a coincidence signal Vhit ("0") to the count instruction unit 55. The count instruction unit 55 does not output the count instruction signal of the counter channel CCH0. Accordingly, the number of times CNT of the counter channel CCH0 is not updated.

In the counter control unit 40 provided corresponding to the counter channel CCH1, the VM coincidence determination unit 45 outputs a coincidence signal Vhit ("0") to the count instruction unit 55. Also in the counter control unit 40 provided corresponding to the counter channel CCH2, the VM coincidence determination unit 45 outputs a coincidence signal Vhit ("0") to the count instruction unit 55.

Accordingly, the number of times CNT of the counter channels CCH1 and CCH2 is not updated.

Next, the interrupt processing corresponding to the channel CH10 is explained.

In the counter control unit 40 provided corresponding to the counter channel CCH0, the VM coincidence determination unit 45 outputs a coincidence signal Vhit ("1") to the count instruction unit 55. The additional condition determination unit 50 # outputs a coincidence signal Chit ("1") to the count instruction unit 55. The count instruction unit 55 outputs a count instruction signal of the counter channel CCH0, based on the coincidence signal Vhit ("1") outputted from the VM coincidence determination unit 45 and the coincidence signal Chit ("1") outputted from the additional condition determination unit 50 #. Accordingly, the number of times CNT of the counter channel CCH0 is updated.

In the counter control unit 40 provided corresponding to the counter channel CCH1, the VM coincidence determination unit 45 outputs a coincidence signal Vhit ("0") to the count instruction unit 55.

Also in the counter control unit 40 provided corresponding to the counter channel CCH2, the VM coincidence determination unit 45 outputs a coincidence signal Vhit ("0") to the count instruction unit 55.

Accordingly, the number of times CNT of the counter channels CCH1 and CCH2 is not updated.

Next, the interrupt processing corresponding to the channel CH11 is explained.

In the counter control unit 40 provided corresponding to the counter channel CCH0, the VM coincidence determination unit 45 outputs a coincidence signal Vhit ("1") to the count instruction unit 55. The additional condition determination unit 50 # outputs a coincidence signal Chit ("1") to the count instruction unit 55. The count instruction unit 55 outputs a count instruction signal of the counter channel CCH0, based on the coincidence signal Vhit ("1") outputted from the VM coincidence determination unit 45 and the coincidence signal Chit ("1") outputted from the additional condition determination unit 50 #. Accordingly, the number of times CNT of the counter channel CCH0 is updated.

In the counter control unit 40 provided corresponding to the counter channel CCH1, the VM coincidence determination unit 45 outputs a coincidence signal Vhit ("1") to the count instruction unit 55.

The additional condition determination unit 50 # compares the channel identification number IDNUM ("1") with the channel identification number CID ("1") and outputs a coincidence signal Chit ("1"). The count instruction unit 55 outputs a count instruction signal of the counter channel CCH1, based on the coincidence signal Vhit ("1") outputted from the VM coincidence determination unit 45 and the coincidence signal Chit ("1") outputted from the additional condition determination unit 50 #. Accordingly, the number of times CNT of the counter channel CCH1 is updated.

In the counter control unit 40 provided corresponding to the counter channel CCH2, the VM coincidence determination unit 45 outputs a coincidence signal Vhit ("0") to the count instruction unit 55.

Accordingly, the number of times CNT of the counter channel CCH2 is not updated.

Next, the interrupt processing corresponding to the channel CH20 is explained.

In the counter control unit 40 provided corresponding to the counter channel CCH0, the VM coincidence determination unit 45 outputs a coincidence signal Vhit ("1") to the count instruction unit 55. The additional condition determination unit 50 # outputs a coincidence signal Chit ("1") to the count instruction unit 55. The count instruction unit 55 outputs a count instruction signal of the counter channel CCH0, based on the coincidence signal Vhit ("1") outputted from the VM coincidence determination unit 45 and the coincidence signal Chit ("1") outputted from the additional condition determination unit 50 #. Accordingly, the number of times CNT of the counter channel CCH0 is updated.

In the counter control unit 40 provided corresponding to the counter channel CCH1, the VM coincidence determination unit 45 outputs a coincidence signal Vhit ("0") to the count instruction unit 55.

Accordingly, the number of times CNT of the counter channel CCH1 is not updated.

In the counter control unit 40 provided corresponding to the counter channel CCH2, the VM coincidence determination unit 45 outputs a coincidence signal Vhit ("0") to the count instruction unit 55.

The additional condition determination unit 50 # compares the channel identification number IDNUM ("2") with the channel identification number CID ("2"), and outputs a coincidence signal Chit ("1"). The count instruction unit 55 outputs a count instruction signal of the counter channel CCH2, based on the coincidence signal Vhit ("1") outputted from the VM coincidence determination unit 45 and the coincidence signal Chit ("1") outputted from the additional condition determination unit 50 #. Accordingly, the number of times CNT of the counter channel CCH2 is updated.

Next, the interrupt processing corresponding to the channel CH21 is explained.

In the counter control unit 40 provided corresponding to the counter channel CCH0, the VM coincidence determination unit 45 outputs a coincidence signal Vhit ("1") to the count instruction unit 55. The additional condition determination unit 50 # outputs a coincidence signal Chit ("1") to the count instruction unit 55. The count instruction unit 55 outputs a count instruction signal of the counter channel CCH0, based on the coincidence signal Vhit ("1") outputted from the VM coincidence determination unit 45 and the coincidence signal Chit ("1") outputted from the additional condition determination unit 50. Accordingly, the number of times CNT of the counter channel CCH0 is updated.

In the counter control unit 40 provided corresponding to the counter channel CCH1, the VM coincidence determination unit 45 outputs a coincidence signal Vhit ("0") to the count instruction unit 55.

Accordingly, the number of times CNT of the counter channel CCH1 is not updated.

In the counter control unit 40 provided corresponding to the counter channel CCH2, the VM coincidence determination unit 45 outputs a coincidence signal Vhit ("0") to the count instruction unit 55.

The additional condition determination unit 50 # compares the channel identification number IDNUM ("2") with the channel identification number CID ("2"), and outputs a coincidence signal Chit ("1"). The count instruction unit 55 outputs a count instruction signal of the counter channel CCH2, based on the coincidence signal Vhit ("1") outputted from the VM coincidence determination unit 45 and the coincidence signal Chit ("1") outputted from the additional condition determination unit 50 #. Accordingly, the number of times CNT of the counter channel CCH2 is updated.

According to the method concerned, it is possible to perform the count processing as a common group by setting up the channel identification number even when the channels CH are different. According to this setting, it is possible to reduce the number of the counters by grouping, even when there is multiple channels CH to count from the viewpoint of safety.

By setting up the channel identification number CID for each safety level, it is also possible to handle the case where the channels to be monitored are divided into some safety levels.

Embodiment 3

Figure 17:
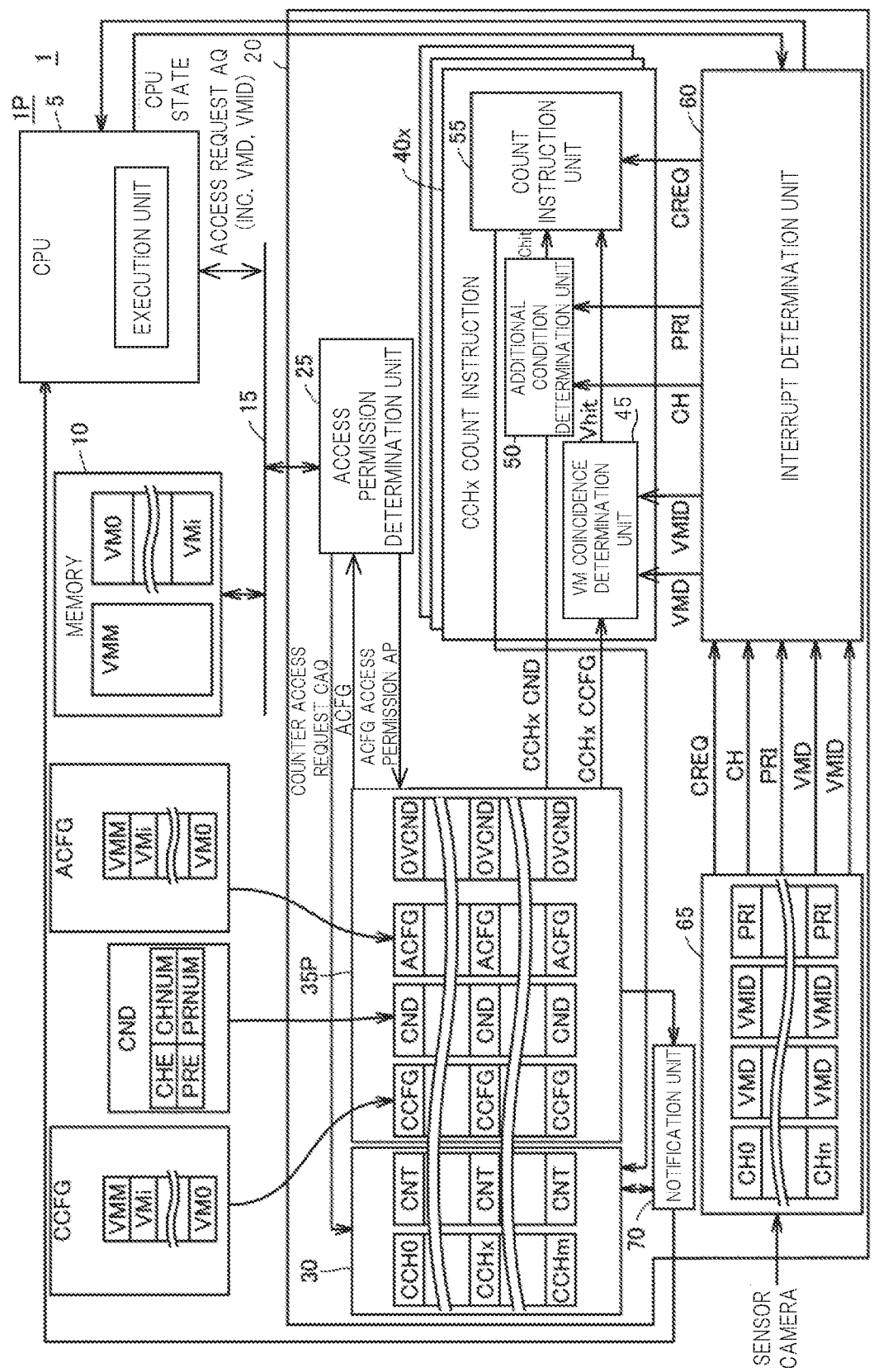
FIG. 17 is a drawing illustrating a data processing device 1P and its peripheral circuit according to Embodiment 3.

FIG. 17 illustrates a data processing device 1P and its peripheral circuit according to Embodiment 3.

With reference to FIG. 17, the data processing device 1P is different from the data processing device 1 in that the count condition setting unit 35 is replaced with the count condition setting unit 35P and a notification unit 70 is further provided. The other configurations are the same as explained with reference to FIG. 2 in Embodiment 1. Therefore, the detailed explanation thereof is not repeated.

The count condition setting unit 35P is set up with the conditions OVCND for giving the exception notice with respect to the number of times CNT, as compared with the count condition setting unit 35.

The condition OVCND is set up with the threshold of the number of times CNT in order to give the exception notice, as an example.

The notification unit 70 outputs an exception notification signal to the CPU 5, based on the number of times CNT of counting corresponding to the counter channel CCH and the information on the condition OVCND.

For example, the notification unit 70 compares the number of times CNT with the threshold set to the condition OVCND. When the number of times CNT reaches the threshold of the condition OVCND, an exception notification signal is outputted to the CPU 5.

The CPU 5 receives the exception notification signal and recognizes it as an error, for example.

For example, it is possible to switch the control to the virtual machine monitor VMM and to execute the error processing.

When there is no notice function, it is possible to execute an error processing after the control is switched to the virtual machine monitor VMM. However, according to the configuration according to Embodiment 3, when there is an error, it is possible to switch the control to the virtual machine monitor VMM immediately and to perform the error processing. Accordingly, it is possible to improve the safety level.

The condition OVCND is not restricted to the threshold at which the exception notice is performed, however, it may include other information.

For example, the condition OVCND may be the information indicative of the bit position serving as the determination target of the overflow. For example, when the threshold is set as "32", the 6th bit is specified as the determination target. When the 6th bit changes from "0" to "1", it may be determined that an overflow occurs and an exception notification signal may be outputted to the CPU 5.

Alternatively, the condition OVCND may indicate the bit that is set when the number of times CNT overflows.

Alternatively, the range of the threshold of an upper limit or a lower limit may be set as the condition OVCND. For example, the lower limit "80" and the upper limit "120" may be set up.

The notification unit 70 does not output the exception notification signal, when the number of times CNT is within the range concerned. On the other hand, the notification unit 70 outputs an exception notification signal, when the number of times CNT is not within the range concerned.

In the present example, the case where the number of times CNT is incremented according to the count instruction signal is explained as an example. However, it is not restricted the case described above in particular. It is also preferable to adopt the method in which the number of times CNT may be decremented and subtracted. It is also preferable to adopt the method in which the above-described methods are combined and the number of times CNT may be subtracted and added.

As described above, the invention accomplished by the present inventors has been concretely explained based on the embodiments. However, it cannot be overemphasized that the present invention is not restricted to the embodiments as described above, and it can be changed variously in the range which does not deviate from the gist.

What is claimed is:

1. A data processing device comprising:
   an arithmetic unit to execute each of a plurality of virtual machines; and
   an interrupt controller to instruct the arithmetic unit to execute interrupt processing with virtual machine information that specifies at least one of the virtual machines,
   wherein the interrupt controller comprises a counter to count the number of interrupts for each virtual machine based on the virtual machine information.

2. The data processing device according to claim 1,
   wherein the interrupt controller further instructs the arithmetic unit to execute interrupt processing with the virtual machine information that specifies a virtual machine manager managing the virtual machines, and
   wherein the counter counts the number of interrupts for each virtual machine and each virtual machine manager, based on the virtual machine information.

3. The data processing device according to claim 2,
   wherein the interrupt controller has a plurality of interrupt channels for accepting a requirement of the interrupt processing,
   wherein the interrupt controller outputs to the arithmetic unit, interrupt channel information to specify at least one of the interrupt channels, and
   wherein the counter counts the number of interrupts for each virtual machine, based on the virtual machine information and the interrupt channel information.

4. The data processing device according to claim 1,
   wherein the interrupt controller further comprises:
   a count condition setting unit to set a count condition for the counter; and
   a counter control unit to control the counter that counts the number of interrupts for each virtual machine based on the count condition set by the count condition setting unit.

5. The data processing device according to claim 4, wherein the interrupt controller further comprises an interrupt determination unit to instruct to the counter control unit the execution of operation, based on a state of the arithmetic unit.

6. The data processing device according to claim 4,
   wherein the counter control unit comprises:
   a determination unit to receive information on the virtual machine performing the interrupt processing and to determine whether the count condition is satisfied; and
   a count instruction unit to instruct the counter to count, based on the determination result of the determination unit.

7. The data processing device according to claim 6,
   wherein the determination unit compares identification information of the virtual machine set as a count target set by the count condition setting unit with identification information of the virtual machine included in the received information of the virtual machine and performing the interrupt processing, and
   wherein the count instruction unit instructs the counter to perform the count, based on the comparison result.

8. The data processing device according to claim 6,
   wherein the determination unit compares channel information set as the count target set by the count condition setting unit with channel information associated with the received information of the virtual machine, and
   wherein the count instruction unit instructs the counter to perform the count, based on the comparison result.

9. The data processing device according to claim 6,
   wherein the determination unit compares priority information set as the count target set by the count condition setting unit with priority information associated with the received information of the virtual machine, and
   wherein the count instruction unit instructs the counter to perform the count, based on the comparison result.

10. The data processing device according to claim 4, wherein the count condition setting unit further has an access condition indicative of a condition to enable access to the information on the count condition, and wherein the interrupt controller further comprises:

an access permission determination unit to control access by execution of the virtual machine to the information on the count condition, based on the access condition.

11. The data processing device according to claim 4, wherein a determination unit compares channel identification information set as the count target set by the count condition setting unit with channel identification information associated with the received information of the virtual machine, and wherein a count instruction unit instructs the counter to perform the count, based on the comparison result.

12. The data processing device according to claim 4, wherein the interrupt controller further comprises a notification unit to notify to the arithmetic unit based on the count value of the counter, wherein the count condition setting unit further has a notification condition indicative of a condition to notify to the arithmetic unit based on the count value of the counter, and wherein the notification unit notifies to the arithmetic unit based on the count value of the counter and the notification condition.

13. The data processing device according to claim 1, wherein the interrupt controller further comprises a notification unit to notify to the arithmetic unit based on the count value of the counter.

14. The data processing device according to claim 13, wherein the notification unit notifies to the arithmetic unit that the virtual machine for which the count value of the counter indicates a predetermined value is abnormal.

* * * * *